3,295,192
HEAT EXCHANGER AND METHOD OF MAKING SAME
Clyde S. Simpelaar, Racine, Wis., assignor to Modine Manufacturing Company, Racine, Wis., a corporation of Wisconsin
Filed Sept. 8, 1964, Ser. No. 394,877
4 Claims. (Cl. 29—157.3)

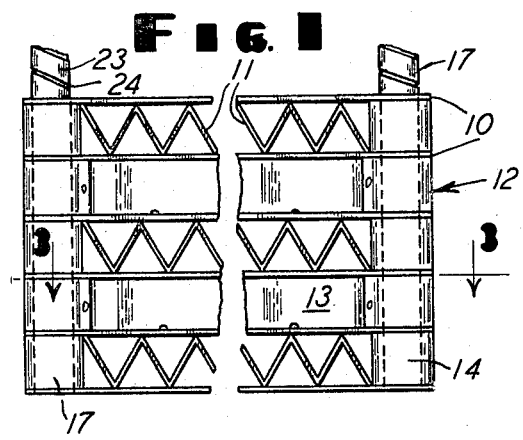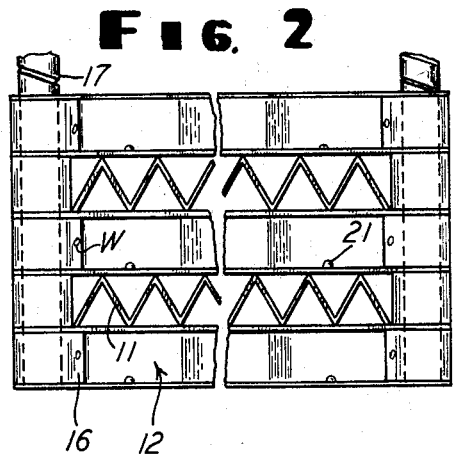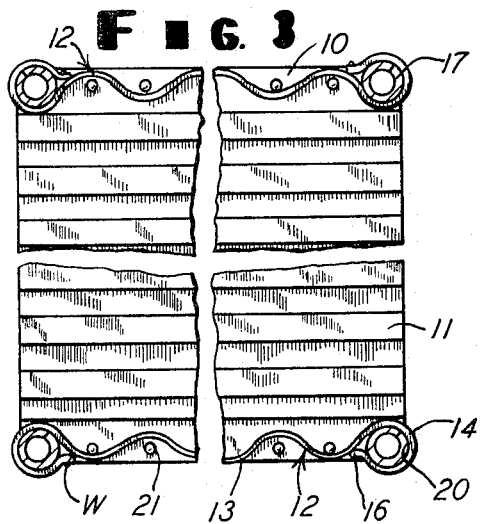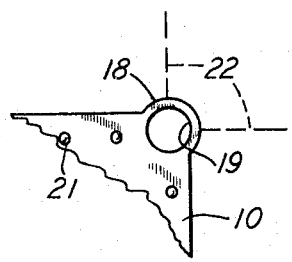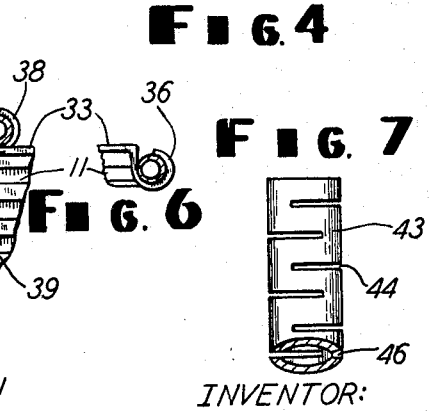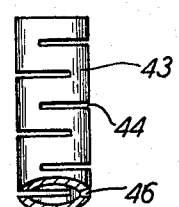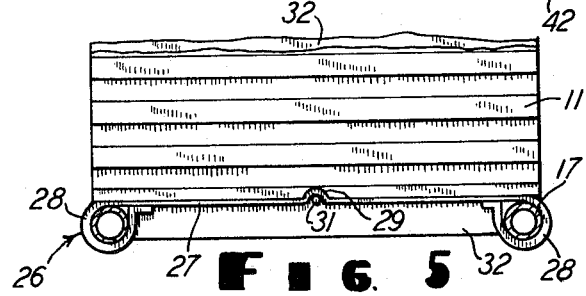
INVENTOR:
CLYDE S. SIMPELAAR യ
United States Patent Office 3,295,192
Patented Jan. 3, 1967

This invention relates to a heat exchanger and a method of making same.

One application of this particular heat exchanger is in a gas turbine recuperator which is generally of a large size, and on the combustion air side, pressures are high and require large size connections. This means that the use of heavy wall ducts is required. The core or matrix, particularly the case of compact exchangers for mobile use such as passenger cars, is generally fabricated of materials with a thickness considerably less than the duct wall thickness. The difference in thicknesses has presented a problem in the making of a satisfactory transition from the heavy gauge of the connecting ducts to the light gauge of the matrix. The problem has been one of transferring the stress from the immediate connection into a substantial portion of the matrix.

One of the early attempts to solve this problem was to use solid side closure bars in the matrix, and these bars overlapped at the corners much like the logs of a log cabin. This gave a continuous solid corner of heavy material to which heavy connection weldments could be made. However, the matrix of this type also gave a problem in the excess weight and the problem of fixturing to maintain location and shape of the parts in the matrix. Another problem with the wide side closure bars was that in the normal process of bonding, particularly with brazing materials, and even if solder were used it is well-known that it would be difficult to produce a satisfactory bond. This was true since there were usually voids caused by gas pockets or lack of good contact because of the wide closure bar, and these voids produce leak passes, and also the broader the contacting bond areas the less perfect is the bond itself.

Another solution was to use channels for the side closures to reduce weight. However this did not provide closed ends and a solid corner unless auxiliary pieces were bonded in.

It is a general object of this invention to provide a heat exchanger which overcomes the aforementioned problems.

A more specific object of this invention is to provide a light weight and low cost heat exchanger having the application heretofore mentioned.

Still another object of this invention is to provide a heat exchanger which has structural integrity and strength in relation to its connection in the complete system mentioned.

Still a further object of this invention is to provide a method for manufacturing a heat exchanger having the aforementioned objects and advantages and of course to be able to do so in an efficient, inexpensive, and convenient manner utilizing other conventional methods for the manufacture.

Still another specific object of this invention is to provide a heat exchanger which is made of desirable light gauge material, but which is also suitable for connection to heavier gauge material in the external connections.

Still another specific object of this invention is to provide a heat exchanger which accommodates a high degree of transfer of stresses through the exchanger and does so with a minimum of stress concentration.

Still a further object of this invention is to provide a heat exchanger wherein the parts thereof are readily assembled in proper alignment, and no alignment preparation of separator sheets or the like is required with regard to the assembled structure. Other objects and advantages become apparent upon reading the following description in light of the accompanying drawings wherein:

FIG. 1 is a front elevational view of a fragment of a heat exchanger embodying this invention.

FIG. 2 is a side elevational view of FIG. 1.

FIG. 3 is a sectional view taken along the line 3—3 of FIG. 1.

FIG. 4 is a top plan view of a fragment of a separator sheet shown in FIG. 1, and the view also shows the location of duct connections in dotted lines.

FIG. 5 is a top plan view of a fragment of an exchanger showing a modification thereof.

FIG. 6 is a top plan view of a corner of an exchanger showing a modification thereof.

FIG. 7 is a side elevational view of a modified corner pin.

The construction of the exchanger is of course shown in the drawings, and the construction will be described along with the method of making the exchanger. The exchanger is of the sandwich type having layers of sheets and fins for the usual crossflow of fluid in the well-known manner. U.S. Patent No. 2,959,401 issued November 8, 1960, shows this type of heat exchanger also.

A plurality of separator sheets 10 are disposed in parallel and spaced-apart relation with serpentine-shaped fins 11 extending therebetween. Alternate pairs of the sheets 10 of course form the separate passes for the fluids flowing through the exchanger, and side closure bars generally designated 12 confine the fluid along with the respective separator sheets 10. The drawings show that the sheets 10 and side closures 12 are of essentially the same thickness or gauge; thus the side closures can be made of the thin gauge material like that of the separator sheets, but of course the exchanger is nevertheless sufficiently sturdy and is fluid-tight and has the other advantages heretofore mentioned. FIG. 3, particularly, shows the side closures 12 to consist of intermediate portions 13 which are of a serpentine or wave form, and the side closures also have end curls or loops 14. The end limit 16 of the closures 12 are overlapped on the intermediate length 13 of closures 12, and the end 16 can be welded to the intermediate length 13 by the weldment designtaed W. Also it will be noted that the curls 14 are disposed so that the joint and weldment W will be to the outside of the exchanger and the closure 12, and therefore there can be no leakage through the joint or past the side closure because of the curl 14.

Alignment pins 17 are disposed with one on each of the corners of the exchanger as shown. The pins 17 are shown to be of a coiled configuration similar to a coil spring, and they extend through the height of the exchanger as shown in FIGS. 1 and 2. Further, the coils of the pins 17 are spaced apart so that they can be displaced axially of the pin. That is, the pin 17 can be axially compressed or contracted by the usual fixture utilized in pressing the exchanger for bonding purposes.

It will therefore be understood that in the assembly of the exchanger, the sheets 10 are provided with corners 18 which have openings 19. The sheets are assembled on the coiled pins 17 along with the side closures 12 which are previously formed with the curled ends 14. The sheets 10 and the side closures 12 can therefore be simply dropped onto the pins 17 in the arrangement shown. Of course the intervening fins 11 would also be included in the assembly. Subsequently, the assembled unit is placed in a fixture which compresses the unit axially of the pins 17 to compress and contract the pins 17 and thereby provide for good bonding of the entire exchanger as the sheets 10, fins 11, and side closures 12 are all placed in physical contact through the fixturing mentioned. Of course the exchanger would be built up beyond the extent shown in FIGS. 1 and 2, and the pins 17 would be slightly higher than the height of the other three parts of the exchanger, so that the compression could be effected as mentioned. Thus, flat fixture plates can be used on the top and bottom of the exchanger for compressing in the bonding process; no holes or other special arrangements are required in the plates to accommodate the pins.

The wave or serpentine form of the side closures 12 permits the use of the light gauge material mentioned, and it also provides for expansion and contraction in the length of the side closures 12, in response to temperature changes prior to bonding. Thus, in the heat bonding process of the exchanger, the side closures 12 would simply expand in each wave to expand outwardly and inwardly with respect to the exchanger, and thereby they would not create any internal strain in the length of the side closures 12. Thus the side closures would be suitably bonded to the sheets 10, and no thermal-induced strain would be built into the exchanger.

It will be noted that the member 12 has openings 20 in the ends thereof for receiving the pins 17. Also, the sheets 10 are shown to be provided with dimples 21 which provide for confinement of the wave form of the side closures 12 in the direction opposite to that of the heretofore described heat expansion of the side closures 12. The dimples 21 therefore both locate and secure the closures 12 in their desired positions. Also, the wave-shaped side closure bars 12 will not tip in the assembly, like a straight side closure bar would tend to tip, particularly when the assembly is compressed. Further, the wave form of side closures 12 gives greater strength in both compression and tension along the length of the side closures 12, as compared to a straight side closure 12.

In the bonding of the entire exchanger, the space between the various coils in the pin 17 can actually be filled with bonding material so that the entire corner piece is completely solid and bonded as desired.

FIG. 4 shows duct connections indicated by dotted lines 22, and these connections would of course come into the corners of the exchanger in the heavy gauge material mentioned, and the exchanger corners could actually be cut to accommodate the lines or connections 22. The pins 17, being of coiled configuration and axially compressible, and upon compression of the pins, will expand readily into snug contact with the sheet walls defining the openings 19 and the side closure walls defining their openings 20.

It will be noted that the pins 17 have each solid coil 23 of an axial height more than several times the axial height of the spaces 24 between the coils 23. This renders the pins 17 self-supporting and stable against lateral flexibility which would preclude the corner alignment desired. Also, the sheets 10 cannot slip into the spaces 24 because of the steep lead of the spiral.

FIG. 5 shows a modification of the side closure, and here a side closure 26 is shown to include the intermediate portion 27 and the curled ends 28. Only a single wave 29 is shown in the side closure 26, and this wave is piloted and guided by a dimple 31 on a sheet 32 which is formed and shaped like the sheet 10 except for the dimpling on the respective sheets. Thus the closure 26 permits the thermal expansion and contraction to the single wave 29, and also the wave 29 permits the sheet to stand up in its desired and necessary position extending between the two pairs of sheets 32 without tipping.

FIG. 6 shows still another embodiment of the exchanger, and here it will be noted that the side closure 33 extends around a corner 34 and into a curl 36. The curl 36 of course encircles the pin 17 in the usual manner. Here it will also be noted that another side closure identical to the side closure 33 but for distinction designated 37, is included in the exchanger in the layer below, and it has its curl 38 as shown. Here also the closure 37 has multiple waves 39 or of course is serpentine-shaped to extend around the dimples 41 on the sheet 42. With the arrangement shown in FIG. 6, the side closures 33 and 37 are assembled in the exchanger on the pins 17 in the manner described in the embodiment shown in FIGS. 1 and 2. The exchanger is of course then thermally bonded, and the feature of expansion of the side closures is present, and also the feature of the compressible pins 17 is present. An additional feature in this embodiment is that the curls 36 and 38, along with the pins 17, can be sheared off flush with the outer surfaces of the respective side closures 33 and 37 after the bonding process is completed. This therefore leaves a right-angled corner to the exchanger matrix, and this corner can then be attached by welding or the like to duct work in the well-known manner. The corner presented is thus virtually a solid type corner with the respective side closures 33 and 37 overlapping the corners as shown to present the solid corner described. This arrangement therefore shows the advantageous method of making the exchanger with the side closures shown and described.

FIG. 7 shows still a different embodiment of the corner pin which is collapsible. In this instance the pin is cylindrically shaped and is designated 43. The pin has slots 44 extending radially therein and has an opening 46 along one axial side thereof so that the pin can be slightly adjustable radially if necessary for the assembly of the parts mentioned. Of course the slots 44 will permit the collapsing of the pin 43 upon compression of the entire assembly as in the embodiment described in FIG. 1. Pins 43 could then be spread radially to be larger than the outer diameter of the curls 14 to fit over curls 14 and corners 18.

With further regard to FIG. 5, it will be noted that the fins 11 are in abutment with the wave 29 to further locate and support the bar 27 prior to final bonding in the assembly. Also, FIG. 6 indicates that the bars 33 and 37 are angularly shaped around the corners 34 with the ends of the bars having the curls 36 and 38. Then the sheets 42 are without the corners 18 as on the sheets 10.

While a specific method and embodiment of this invention have been shown and described, it should be obvious that certain changes could be made therein and the invention should therefore be determined only by the scope of the appended claims.

What is claimed is:

1. A method of making a heat exchanger of the type including spaced-apart sheets and intervening side closure bars, the steps comprising forming openings in said sheets and said intervening bars and assembling them one on top of the other in alternate relation on compressible pins extending through said openings, compressing the assembly including said pins to where said sheets and said bars are in abutting contact, and fluid-tightly bonding the assembly at the places of contact.

2. A method of making a heat exchanger of the type including spaced-apart sheets and intervening side closure bars, the steps comprising forming openings in said sheets and curling the ends of said intervening bars to form end openings, forming the lengths of said bars in a serpentine shape, assembling said sheets and said bars one on top of the other in alternate relation on compressible pins extending through said openings in said sheets and said bars, compressing the assembly including said pins axially of said pins to where said sheets and said bars are in abutting contact, and fluid-tightly bonding the assembly at the places of contact.

3. A method of making a heat exchanger of the type including spaced-apart sheets and intervening side closure bars having end openings, the steps comprising forming corner openings in said sheets and assembling them with said bars one on top of the other in alternate relation on compressible pins extending through said openings, compressing the assembly including said pins axially of said pins to where said sheets and said bars and said pins are in abutting contact, and fluid-tightly bonding the assembly at the places of contact.

4. A method of making a heat exchanger of the type including spaced-apart sheets and intervening side closure bars, the steps comprising forming said bars into an angular shape and with a curl on the ends thereof, stacking said sheets and said intervening bars one on top of the other in alternate relation on compressible pins extending through said curls, compressing the assembly including said pins to where said sheets and said bars are in abutting contact, fluid-tightly bonding the assembly at the places of contact, and cutting off said curls with said pins to leave a square corner on said exchanger.

References Cited by the Examiner

UNITED STATES PATENTS

| Re. 16,807 | 12/1927 | Haber | 165—95 |
|---|---|---|---|
| 2,912,749 | 11/1959 | Bauernfeind et al. | 165—167 X |
| 2,961,222 | 11/1960 | Butt | 165—166 |
| 3,163,209 | 12/1964 | Shinn | 165—83 |

FOREIGN PATENTS 838,466    6/1960   Great Britain.

MEYER PERLIN, *Primary Examiner.*

ROBERT A. O'LEARY, *Examiner.*

A. W. DAVIS, *Assistant Examiner.*